US011723051B2

(12) United States Patent
Yoshioka et al.

(10) Patent No.: US 11,723,051 B2
(45) Date of Patent: Aug. 8, 2023

(54) USER TERMINAL

(71) Applicant: NTT DOCOMO, INC., Tokyo (JP)

(72) Inventors: Shohei Yoshioka, Tokyo (JP); Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 275 days.

(21) Appl. No.: 17/269,058

(22) PCT Filed: Aug. 20, 2018

(86) PCT No.: PCT/JP2018/030671
§ 371 (c)(1),
(2) Date: Feb. 17, 2021

(87) PCT Pub. No.: WO2020/039484
PCT Pub. Date: Feb. 27, 2020

(65) Prior Publication Data
US 2021/0258966 A1 Aug. 19, 2021

(51) Int. Cl.
*H04W 72/21* (2023.01)
*H04W 72/53* (2023.01)
(Continued)

(52) U.S. Cl.
CPC ....... *H04W 72/53* (2023.01); *H04W 72/0446* (2013.01); *H04W 72/21* (2023.01); *H04W 80/02* (2013.01)

(58) Field of Classification Search
CPC ......... H04W 72/0413; H04W 72/0446; H04W 80/02; H04W 72/0493; H04L 1/1854; H04L 1/1858
See application file for complete search history.

(56) References Cited

U.S. PATENT DOCUMENTS

2016/0226649 A1* 8/2016 Papasakellariou ...... H04W 4/70
2016/0309510 A1* 10/2016 Wong ...................... H04W 4/70
(Continued)

FOREIGN PATENT DOCUMENTS

JP 2017506440 A 3/2017
WO WO-2019215935 A1 * 11/2019 ........... H04L 1/1854

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
(Continued)

*Primary Examiner* — Joseph E Avellino
*Assistant Examiner* — Charles E Eckholdt

(57) ABSTRACT

A user terminal according to one aspect of the present disclosure includes a transmitting section that transmits, when a transmission timing of uplink control information (UCI) using a physical uplink control channel (PUCCH) overlaps with a transmission timing of a physical uplink shared channel (PUSCH), the UCI using the PUSCH, and a control section that controls which of a repetition transmission configuration of the PUCCH and a repetition transmission configuration of the PUSCH is to be used to determine the number of times of repetition transmission of the PUSCH including the UCI. According to one aspect of the present disclosure, a UCI repetition configuration can be appropriately determined.

3 Claims, 7 Drawing Sheets

(51) Int. Cl.
  *H04W 72/0446* (2023.01)
  *H04W 80/02* (2009.01)

(56) References Cited

U.S. PATENT DOCUMENTS

| | | | |
|---|---|---|---|
| 2016/0381674 A1* | 12/2016 | Kim | H04L 5/001 370/329 |
| 2019/0223205 A1* | 7/2019 | Papasakellariou | H04L 5/0044 |
| 2019/0230683 A1* | 7/2019 | Akkarakaran | H04L 5/0053 |
| 2021/0258966 A1* | 8/2021 | Yoshioka | H04W 72/0413 |

OTHER PUBLICATIONS

International Search Report issued in International Application No. PCT/JP2018/030671, dated Sep. 11, 2018 (5 pages).
Written Opinion issued in International Application No. PCT/JP2018/030671; dated Sep. 11, 2018 (5 pages).

* cited by examiner

USER TERMINAL

TECHNICAL FIELD

The present disclosure relates to a user terminal in a next-generation mobile communication system.

BACKGROUND ART

In the Universal Mobile Telecommunications System (UMTS) network, the specifications of long term evolution (LTE) have been drafted for the purpose of further increasing high speed data rates, providing lower delays, and the like (see Non Patent Literature 1). In addition, the specifications of LTE-A (LTE Advanced, LTE Rel. 10-14) have been drafted for the purpose of further increasing the capacity and sophistication of LTE (LTE Rel. 8, 9).

LTE successor systems (e.g., referred to as Future Radio Access (FRA), 5th generation mobile communication system (5G), 5G+(plus), New Radio (NR), New radio access (NX), Future generation radio access (FX), LTE Rel. 15 or later) are also under study.

In the existing LTE systems (e.g., LTE Rel. 8-14), a user terminal (User Equipment (UE)) uses at least one of a UL data channel (e.g., Physical Uplink Shared Channel (PUSCH)) and a UL control channel (e.g., Physical Uplink Control Channel (PUCCH)) to transmit uplink control information (UCI).

For example, the UCI may include retransmission control information (also referred to as Hybrid Automatic Repeat reQuest Acknowledgment (HARQ-ACK), ACK/NACK, A/N, etc.) for downlink shared channel (Physical Downlink Shared Channel (PDSCH)), scheduling request (SR), channel state information (CSI), and the like.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (e.g., NR), the UE may transmit both the UCI and uplink data (Uplink Shared Channel (UL-SCH)) using the PUSCH when UCI transmission using the PUCCH and PUSCH transmission occur at the same or overlapping timings.

Meanwhile, in the NR, it has also been considered to transmit UCI using the PUSCH without transmitting uplink data (UL-SCH).

However, when the UCI is simply piggybacked (transmitted) to the PUSCH in the case where the repetition number of the PUCCH is different from the repetition number of the PUSCH, the UCI is to be transmitted using the repetition number different from the originally expected repetition number of the UCI (PUCCH). In this case, the expected effect of repetition transmission may not be exhibited, and communication throughput may decrease.

In view of the above, it is an object of the present disclosure to provide a user terminal capable of appropriately determining a UCI repetition configuration.

Solution to Problem

A user terminal according to one aspect of the present disclosure includes a transmitting section that transmits, when a transmission timing of uplink control information (UCI) using a physical uplink control channel (PUCCH) overlaps with a transmission timing of a physical uplink shared channel (PUSCH), the UCI using the PUSCH, and a control section that controls which of a repetition transmission configuration of the PUCCH and a repetition transmission configuration of the PUSCH is to be used to determine the number of times of repetition transmission of the PUSCH including the UCI.

Advantageous Effects of Invention

According to one aspect of the present disclosure, a UCI repetition configuration can be appropriately determined.

DESCRIPTION OF EMBODIMENTS (Repetition Transmission)

Figure 1A:
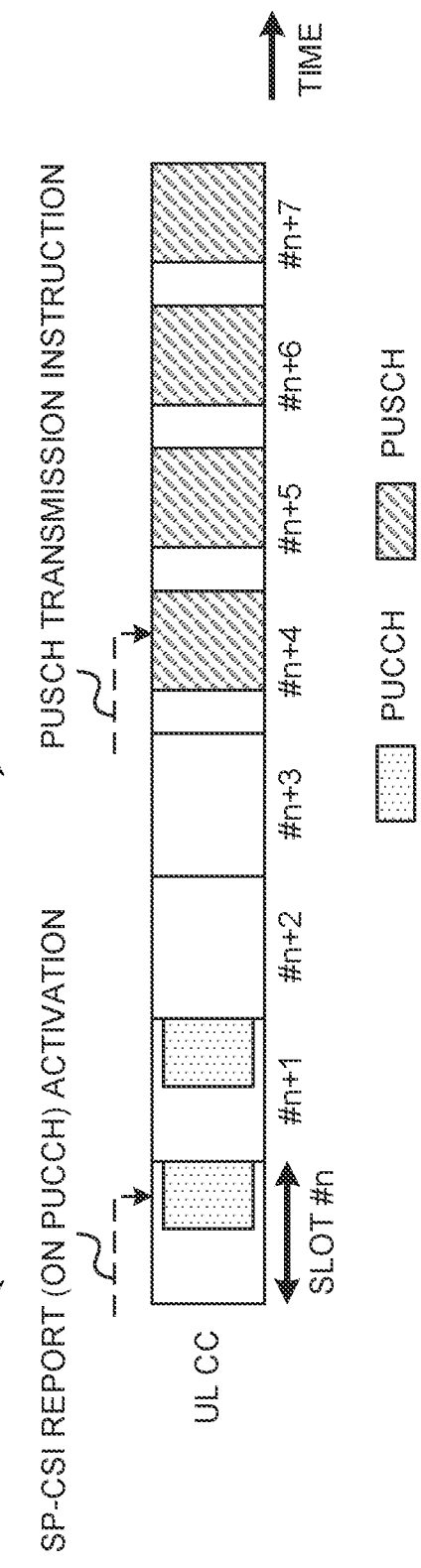
FIGS. 1A and 1B are diagrams illustrating exemplary repetition control of a SP-CSI report/A-CSI report according to one embodiment.

In the NR, it has been considered that UE performs multi-slot transmission for channels such as a PUCCH and a PUSCH. Multi-slot transmission is transmission over multiple slots, and may be called slot aggregation, repetition transmission, or the like. Multi-slot transmission can be expected to expand coverage, improve quality in reception, and the like.

For example, when the UE is configured to perform repetition transmission (reception) of a certain channel using higher layer signaling, physical layer signaling, or a combination thereof, it may perform repetition transmission of the channel. In each slot of the multi-slot transmission, signals having the same contents may be transmitted, or signals having different contents may be transmitted.

Note that, in the present disclosure, the higher layer signaling may be, for example, any of Radio Resource Control (RRC) signaling, Medium Access Control (MAC) signaling, broadcast information, and the like, or a combination thereof.

For the MAC signaling, for example, a MAC control element (MAC CE), a MAC protocol data unit (PDU), or the like may be used. The broadcast information may be, for example, a master information block (MIB), a system information block (SIB), remaining minimum system information (RMSI), other system information (OSI), or the like.

The physical layer signaling may be, for example, downlink control information (DCI).

For the PUSCH repetition, the UE may be configured with a repetition factor by higher layer signaling (e.g., RRC parameter "aggregationFactorUL" for the PUSCH, and RRC parameter "repK" for the configured grant PUSCH). For example, 1, 2, 4, 8, or the like may be set as a repetition number of the PUSCH repetition. In addition, the Redundancy Version (RV) of the PUSCH in each slot during the PUSCH repetition transmission may be different, or may be the same.

The PUCCH repetition may be configured to the UE for a particular format (e.g., PUCCH formats 1, 3, and 4 with a transmission period of equal to or more than four symbols). The repetition factor (e.g., parameter "nrofSlots" included in "PUCCH-FormatConfig" of the RRC) may be configured in common for all the PUCCH formats 1, 3, and 4.

Note that, in the present disclosure, the repetition factor and the repetition number may be read interchangeably. Furthermore, the repetition number may represent a repetition number of specific UL transmission (e.g., PUSCH and PUCCH).

(CSI)

In the NR, the UE measures a channel state using given reference signals (or a resource for the reference signals), and feeds back (reports) channel state information (CSI) to a base station.

The UE may measure the channel state using a channel state information reference signal (CSI-RS), synchronization signal/physical broadcast channel (SS/PBCH) block, synchronization signal (SS), demodulation reference signal (DMRS), and the like.

The CSI-RS resource may include at least one of a non zero power (NZP) CSI-RS and CSI-IM (Interference Management). The SS/PBCH block is a block including a synchronization signal (e.g., primary synchronization signal (PSS) and secondary synchronization signal (SSS)) and a PBCH (and the corresponding DMRS), which may be called an SS block (SSB) or the like.

Note that the CSI may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), layer 1 reference signal received power (L1-RSRP), layer 1 reference signal received quality (L1-RSRQ), a layer 1 signal to interference plus noise ratio (L1-SINR), a layer 1 signal to noise ratio (L1-SNR), and the like.

The CSI may have multiple parts. The CSI part 1 may include information with a relatively small number of bits (e.g., RI). The CSI part 2 may include information with a relatively large number of bits (e.g., CQI) such as information determined on the basis of the CSI part 1.

As a method of feeding back CSI, periodic CSI (P-CSI) report, aperiodic CSI (A-CSI) report, semi-persistent CSI (SP-CSI) report, and the like have been considered.

The UE may be notified of CSI measurement configuration information (e.g., RRC information element "CSI-MeasConfig") using higher layer signaling, physical layer signaling (e.g., downlink control information (DCI)), or a combination thereof. The CSI measurement configuration information may be configured using, for example, the RRC information element "CSI-MeasConfig".

The CSI measurement configuration information may include CSI resource configuration information (RRC information element "CSI-ResourceConfig"), CSI report configuration information (RRC information element "CSI-ReportConfig"), and the like.

The CSI resource configuration information may include information for specifying a resource to be measured (e.g., CSI-RS resource set ID, SSB resource set ID, etc.).

Each CSI report configuration information may include at least one of a report configuration ID (CSI-ReportConfigId), a report type (e.g., P-CSI report, A-CSI report, SP-CSI report using PUCCH, SP-CSI report using PUSCH, etc.), report periodicity (ReportPeriodicity), an offset (ReportSlotOffset), information indicating which reference signal (or resource) is used to report the measured CSI (CSI-ResourceConfigId), and the like.

The SP-CSI report using the PUCCH (PUCCH-based SP-CSI report) may be activated by a MAC CE. The SP-CSI report using the PUSCH (PUSCH-based SP-CSI report), the A-CSI report using the PUSCH, and the like may be activated (or triggered) by DCI.

For example, the CSI request field contained in the DCI may specify the trigger state. The trigger state may be configured by higher layer signaling (e.g., RRC signaling). The trigger state list for the A-CSI report may be configured using the RRC information element "CSI-AperiodicTriggerStateList", and the trigger state list for the SP-CSI report may be configured using the RRC information element "CSI-SemiPersistentOnPUSCH-TriggerStateList". Each trigger state may be associated with one or a plurality of report configuration IDs (CSI-ReportConfigId) and the like.

(UCI on PUSCH)

In the NR, the UE may transmit both the UCI and uplink data (Uplink Shared Channel (UL-SCH)) using the PUSCH when UCI transmission using the PUCCH and PUSCH transmission occur at the same or overlapping timings.

Multiplexing the UCI to the PUSCH may be called UCI on PUSCH, UCI multiplexing on PUSCH, UCI piggyback on PUSCH, and the like.

Meanwhile, in the NR, it has also been considered to transmit the UCI using the PUSCH without transmitting uplink data (UL-SCH) (UCI on PUSCH without uplink data (UCI on PUSCH without UL-SCH)).

However, when the UCI is simply piggybacked (transmitted) to the PUSCH in the case where the repetition number of the PUCCH is different from the repetition number of the PUSCH, the UCI is to be transmitted using the repetition number different from the originally expected repetition number of the UCI (PUCCH). In this case, the expected effect of repetition transmission may not be exhibited, and communication throughput may decrease.

In view of the above, the present inventors have conceived a method capable of appropriately determining a UCI repetition number. According to one aspect of the present disclosure, it becomes possible to flexibly control a repetition number for UCI transmission using a PUCCH, UCI transmission using a PUSCH, and the like.

Hereinafter, embodiments according to the present disclosure will be described in detail with reference to the accompanying drawings. The radio communication method according to each of the embodiments may be applied independently, or may be applied in combination with others.

Hereinafter, although a "specific type" in the present disclosure will be described on the premise of at least one of the A-CSI report and the SP-CSI report, it is not limited thereto. The UCI type in the present disclosure may indicate any of HARQ-ACK, SR (positive SR and negative SR), CSI, CSI part 1, CSI part 2, CSI report types (e.g., P-CSI report, A-CSI report, and SP-CSI report), or a combination thereof (i.e., the UCI type may be read as any one or a combination of these).

(Radio Communication Method)

In one embodiment, when transmitting a specific UCI type, the UE may determine whether to follow the repetition transmission configuration of the PUCCH (e.g., the presence or absence of the repetition and the repetition number) or to follow the repetition transmission configuration of the PUSCH (e.g., the presence or absence of the repetition and the repetition number) on the basis of at least one of the following (1) to (6).

(1) The UE follows the repetition of the PUCCH when transmitting the specific UCI type mentioned above using the PUCCH, and follows the repetition of the PUSCH when transmitting it using the PUSCH.

(2) The UE follows the repetition of the PUCCH when transmitting the specific UCI type mentioned above using the UCI on PUSCH without uplink data, and follows the repetition of the PUSCH when transmitting it using the UCI on PUSCH with uplink data.

(3) The UE does not perform repetition transmission when transmitting the specific UCI type mentioned above using the UCI on PUSCH without uplink data.

(4) The UE does not perform repetition transmission when transmitting the specific UCI type mentioned above using the UCI on PUSCH with uplink data.

(5) The UE follows the repetition configuration of another higher layer parameter (e.g., a parameter different from "aggregationFactorUL", "repK", "nrofSlots", etc. described above) for the transmission of the specific UCI type mentioned above.

(6) The UE determines the repetition configuration to be followed by the specific UCI type mentioned above on the basis of information related to the repetition contained in the MAC signaling (e.g., MAC CE) or the DCI that has triggered the transmission of the specific UCI type mentioned above.

When at least one of the A-CSI report and the SP-CSI report is triggered, for example, the UE may determine the configuration of the repetition transmission of the at least one of the reports on the basis of at least one of (1) to (6) described above.

Figure 1B:
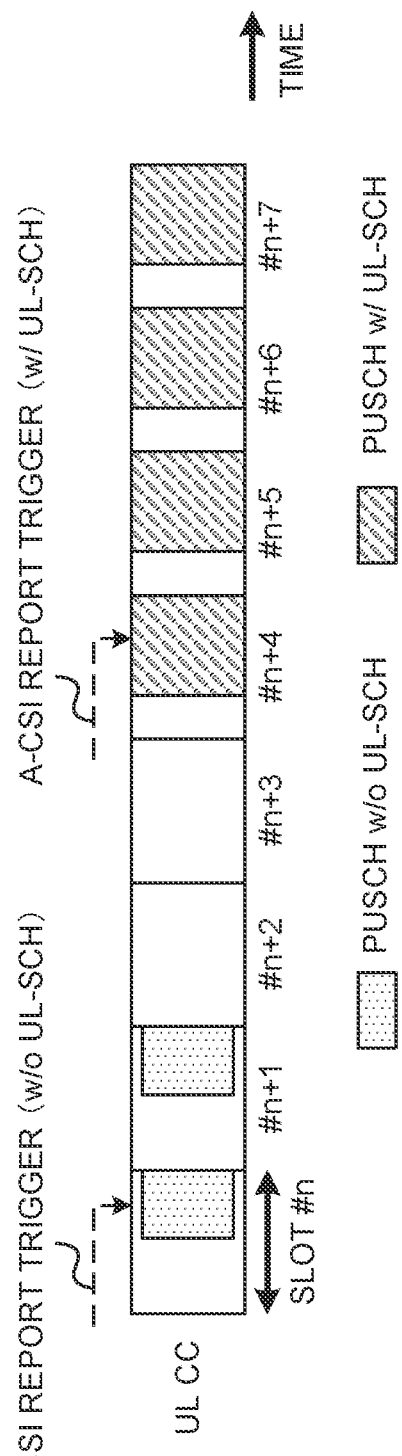

FIGS. 1A and 1B are diagrams illustrating exemplary repetition control of a SP-CSI report/A-CSI report according to one embodiment. In the present embodiment, it is assumed that the repetition transmission configuration of the PUCCH is "with repetition" and the repetition number=2 (slots), and the repetition transmission configuration of the PUSCH is "with repetition" and the repetition number=4 (slots). FIGS. 1A and 1B illustrate UL component carrier (CC) resources.

FIG. 1A illustrates an example in which the UE determines the repetition of the SP-CSI report as a specific UCI type on the basis of (1) described above. The UE receives activation signals (e.g., MAC CE) for making the SP-CSI report using the PUCCH. Note that the SP-CSI report is configured to be performed in a 4-slot cycle from slot #n.

In slot #n in FIG. 1A, the SP-CSI report does not overlap with the PUSCH. Therefore, the UE applies the repetition configuration of the PUCCH to the SP-CSI report using the PUCCH from slot #n. That is, the UE transmits the SP-CSI report using the PUCCH with the repetition number=2 (slot #n and #n+1).

Furthermore, the UE is instructed to perform PUSCH transmission from slot #n+4. In slot #n+4 in FIG. 1A, the SP-CSI report overlaps with the PUSCH. Therefore, the UE piggybacks the SP-CSI report using the PUCCH from slot #n+4 to the PUSCH, and applies the repetition configuration of the PUSCH to the PUSCH transmission. That is, the UE transmits the SP-CSI report using the PUSCH with the repetition number=4 (slot #n+4 to #n+7).

FIG. 1B illustrates an example in which the UE determines the repetition of the A-CSI report as a specific UCI type on the basis of (2) described above.

The UE is triggered for an A-CSI report (without UL-SCH) from slot #n. The UE applies the repetition configuration of the PUCCH to the A-CSI report using the PUSCH without uplink data from slot #n. That is, the UE transmits the A-CSI report using the PUSCH without uplink data with the repetition number=2 (slot #n and #n+1).

Furthermore, the UE is triggered for an A-CSI report (with UL-SCH) from slot #n+4. The UE applies the repetition configuration of the PUSCH to the A-CSI report using the PUSCH with uplink data from slot #n+4. That is, the UE transmits the A-CSI report using the PUSCH with uplink data with the repetition number=4 (slot #n+4 to #n+7).

In other words, the UE to be subject to the PUSCH repetition may perform at least one of the following types of control, for example:

- The PUSCH including a specific UCI type may be repeated regardless of whether the PUSCH includes the UL-SCH;
- The PUSCH including a specific UCI type may not be repeated or may be repeated according to the PUCCH repetition when the PUSCH does not include the UL-SCH, whereas the PUSCH including the specific UCI type is repeated when the PUSCH includes the UL-SCH; and
- The PUSCH including a specific UCI type may not be repeated or may be repeated according to the PUCCH repetition when the PUSCH does not include the UL-SCH.

In other words, the UE to be subject to the PUCCH repetition may perform at least one of the following types of control, for example:

- The PUSCH including a specific UCI type may be repeated regardless of whether the PUSCH includes the UL-SCH;
- The PUSCH including a specific UCI type is repeated when the PUSCH does not include the UL-SCH, whereas the PUSCH including the specific UCI type may not be repeated or may be repeated according to the PUSCH repetition when the PUSCH includes the UL-SCH; and
- The PUSCH including a specific UCI type may not be repeated or may be repeated according to the PUSCH repetition when the PUSCH does not include the UL-SCH.

Note that, when the repetition number of the PUSCH is larger than the repetition number of the PUCCH, for example, it is expected that the CSI performance (reception quality, etc.) can be improved by following the PUSCH repetition, and degradation of data (UL-SCH) can be suppressed by following the PUCCH repetition.

For example, another higher layer parameter of (5) described above may be expressed by an RRC parameter "ApeiodicCSIRepetition" indicating the repetition transmission configuration for the A-CSI report when the UCI type is the A-CSI report, and may be expressed by an RRC parameter "SemiPersistentCSIRepetition" indicating the repetition transmission configuration for the SP-CSI report when the UCI type is the SP-CSI report. The other higher layer parameter may be included in, for example, the CSI report configuration information (CSI-ReportConfig).

The determination based on (5) described above may be applied when the specific UCI type mentioned above is transmitted using at least one of the PUCCH, the UCI on PUSC with uplink data, and the UCI on PUSCH without uplink data.

For example, the UE may follow the repetition configuration of another higher layer parameter when transmitting the specific UCI type mentioned above using the UCI on PUSCH without uplink data, and may follow the repetition of the PUSCH when transmitting it using the UCI on PUSCH with uplink data.

As an example of (6) described above, the DCI or MAC CE that triggers (activates) the A-CSI and/or SP-CSI report may include information indicating the repetition transmission configuration of the report (e.g., at least one of the presence or absence of the repetition and the repetition number), for example. Here, the information indicating the repetition transmission configuration may be information indicating an explicit value, or may be information indicating an implicit value (index).

For example, the information indicating the repetition transmission configuration may be a given field (e.g., CSI request field) included in the DCI that triggers transmission of the specific UCI type. The UE may determine the repetition transmission configuration of the transmission of the specific UCI type on the basis of a correspondence relationship between the given field and the repetition transmission configuration. The correspondence relationship may be defined by specifications or may be configured by higher layer signaling (e.g., RRC signaling).

According to the embodiment described above, the repetition number of the UCI can be appropriately determined.

<Others>

Note that which of (1) to (6) described above is the specific UCI type (e.g., CSI report) based on may be notified to the UE by higher layer signaling, may be associated with the trigger state described above, or may be associated with the report configuration ID (CSI-ReportConfigId) or the like.

For example, the trigger state configuration information (RRC information element "CSI-AperiodicTriggerStateList", "CSI-SemiPersistentOnPUSCH-TriggerStateList", etc.) may include information indicating that CSI report repetition based on a given trigger state is determined on the basis of one or a plurality of (1) to (6) described above. When a CSI report is triggered, the UE may specify the repetition configuration of the case of transmitting the CSI report using the PUCCH or the PUSCH on the basis of the trigger state that has been triggered. According to such a configuration, it becomes possible to dynamically change the repetition configuration of the UCI transmission.

(Radio Communication System)

Hereinafter, a configuration of a radio communication system according to an embodiment of the present disclosure will be described. In the radio communication system, communication is performed using one or a combination of the radio communication methods according to the embodiments of the present disclosure.

Figure 2:
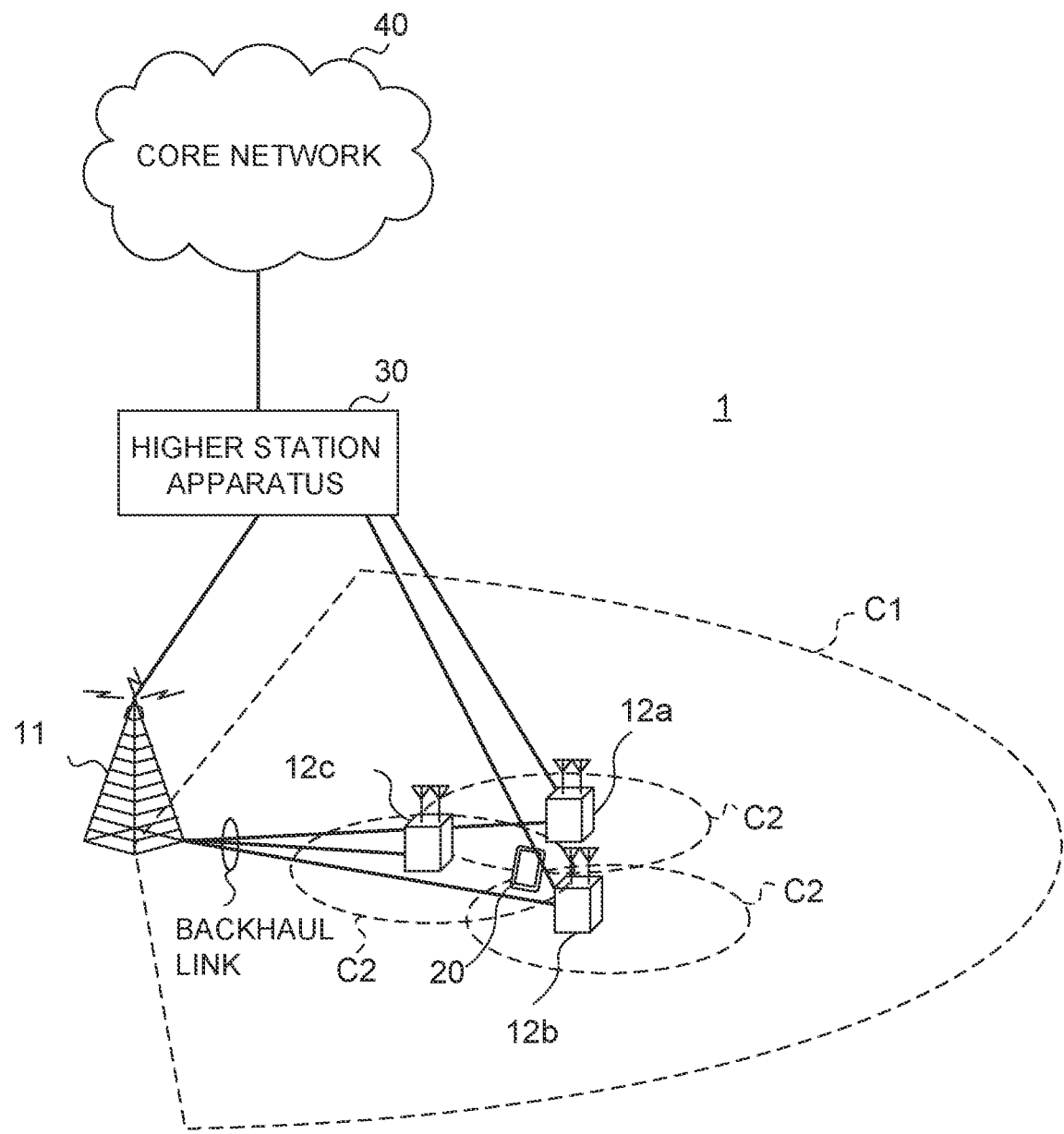
FIG. 2 is a diagram illustrating an exemplary schematic configuration of a radio communication system according to one embodiment.

FIG. 2 is a diagram illustrating an exemplary schematic configuration of a radio communication system according to one embodiment. A radio communication system 1 can adopt at least one of carrier aggregation (CA) and dual connectivity (DC) to group a plurality of fundamental frequency blocks (component carriers) into one, where the system bandwidth (e.g., 20 MHz) constitutes one unit.

Note that the radio communication system 1 may be called "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and the like, or may be seen as a system to implement these.

Furthermore, the radio communication system 1 may support dual connectivity (Multi-RAT Dual Connectivity (MR-DC)) between a plurality of Radio Access Technologies (RATs). The MR-DC may include dual connectivity between the LTE and NR in which an LTE (E-UTRA) base station (eNB) becomes a master node (MN) and an NR base station (gNB) becomes a secondary node (SN) (E-UTRA-NR Dual Connectivity (EN-DC)), dual connectivity between the NR and LTE in which the NR base station (gNB) becomes a MN and the LTE (E-UTRA) base station (eNB) becomes a SN (NR-E-UTRA Dual Connectivity (NE-DC)), and the like.

The radio communication system 1 includes a base station 11 that forms a macro cell C1 covering a relatively wide coverage, and base stations 12 (12a to 12c) that are placed within the macro cell C1 and that form small cells C2, which are narrower than the macro cell C1. Also, a user terminal 20 is placed in the macro cell C1 and in each of the small cells C2. The arrangement, number, and the like of the cells and user terminal 20 are not limited to the aspect illustrated in the figure.

The user terminal 20 can connect with both the base station 11 and the base stations 12. The user terminal 20 may use the macro cell C1 and the small cells C2 simultaneously using CA or DC. Furthermore, the user terminal 20 may apply CA or DC using a plurality of cells (CCs).

Between the user terminal 20 and the base station 11, communication can be carried out using a carrier of a relatively low frequency band (e.g., 2 GHz) and a narrow bandwidth (also called an "existing carrier," a "legacy carrier", etc.). Meanwhile, between the user terminal 20 and the base stations 12, a carrier of a relatively high frequency band (e.g., 3.5 GHz, 5 GHz, etc.) and a wide bandwidth may be used, or the carrier same as that used in the base station 11 may be used. Note that the structure of the frequency band for use in each base station is by no means limited to these.

Further, the user terminal 20 is capable of performing communication in each cell using at least one of time division duplex (TDD) and frequency division duplex (FDD). Further, in each cell (carrier), a single numerology may be applied, or a plurality of different numerologies may be applied.

The base station 11 and the base station 12 (or between two base stations 12) may be connected by wire (e.g., means in conformity with the common public radio interface (CPRI) such as optical fiber, an X2 interface, etc.) or wirelessly.

The base station 11 and the base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME), or the like, but is by no means limited to these. Also, each of the base stations 12 may be connected with the higher station apparatus 30 via the base station 11.

Note that the base station 11 is a base station having a relatively wide coverage, and may be called a "macro base station," an "aggregate node," an "eNB (eNodeB)," a "transmission/reception point", and the like. Also, the base stations 12 are base stations having local coverages, and may be called "small base stations," "micro base stations," "pico base stations," "femto base stations," "HeNBs (Home eNodeBs)," "RRHs (Remote Radio Heads)," "transmission/reception points", and the like. Hereinafter, the base stations 11 and 12 will be collectively referred to as "base stations 10," unless specified otherwise.

Each user terminal 20 is a terminal supporting various communication schemes such as LTE, LTE-A, and 5G, and may be either a mobile communication terminal (mobile station) or a stationary communication terminal (fixed station).

In the radio communication system 1, as a radio access method, orthogonal frequency division multiple access (OFDMA) is applied to the downlink, and at least one of single carrier-frequency division multiple access (SC-FDMA) and OFDMA is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme of reducing an interference between terminals by dividing, for each of terminals, a system bandwidth into bands composed of one or continuous resource blocks, and causing a plurality of terminals to use mutually different bands. Note that the uplink and downlink radio access schemes are not limited to the combinations of these, and other radio access schemes may be used.

In the radio communication system 1, a physical downlink shared channel (PDSCH), a physical broadcast channel (PBCH), a downlink control channel, and the like, which are shared by each user terminal 20, are used as the downlink channel. User data, higher layer control information, a system information block (SIB), and the like are transmitted in the PDSCH. Further, a master information block (MIB) is transmitted in the PBCH.

The downlink control channels include a physical downlink control channel (PDCCH), an enhanced physical downlink control channel (EPDCCH), a physical control format indicator channel (PCFICH), a physical hybrid-ARQ indicator channel (PHICH), and the like. The use of PDCCH causes downlink control information (DCI) or the like including scheduling information of at least one of PDSCH and PUSCH to be transmitted.

Note that DCI that schedules reception of DL data may also be called "DL assignment," and DCI that schedules transmission of UL data may also be called "UL grant."

The use of PCFICH may cause the number of OFDM symbols used for the PDCCH to be transmitted. The PHICH may cause hybrid automatic repeat request (HARQ) delivery acknowledgement information (e.g., also referred to as retransmission control information, HARQ-ACK, ACK/NACK, etc.) for the PUSCH to be transmitted. The EPDCCH is frequency-division-multiplexed with the PDSCH (downlink shared data channel) and used to transmit DCI and the like, in a similar manner to the PDCCH.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)), and the like are used as uplink channels. In the PUSCH, user data, higher layer control information, and the like are communicated. Further, in the PUCCH, downlink radio quality information (Channel Quality Indicator (CQI)), delivery acknowledgement information, scheduling requests (SRs), and the like are communicated. In the PRACH, random access preambles for establishing connections with cells are transmitted.

In the radio communication systems 1, cell-specific reference signals (CRSs), channel state information reference signals (CSI-RSs), demodulation reference signals (DMRSs), positioning reference signals (PRSs), and the like are communicated as downlink reference signals. Further, in the radio communication system 1, measurement reference signals (Sounding Reference Signals (SRSs)), demodulation reference signals (DMRSs), and the like are communicated as uplink reference signals. Note that the DMRSs may be called UE-specific reference signals. Furthermore, the reference signals to be communicated are by no means limited to these.

(Base Station)

Figure 3:
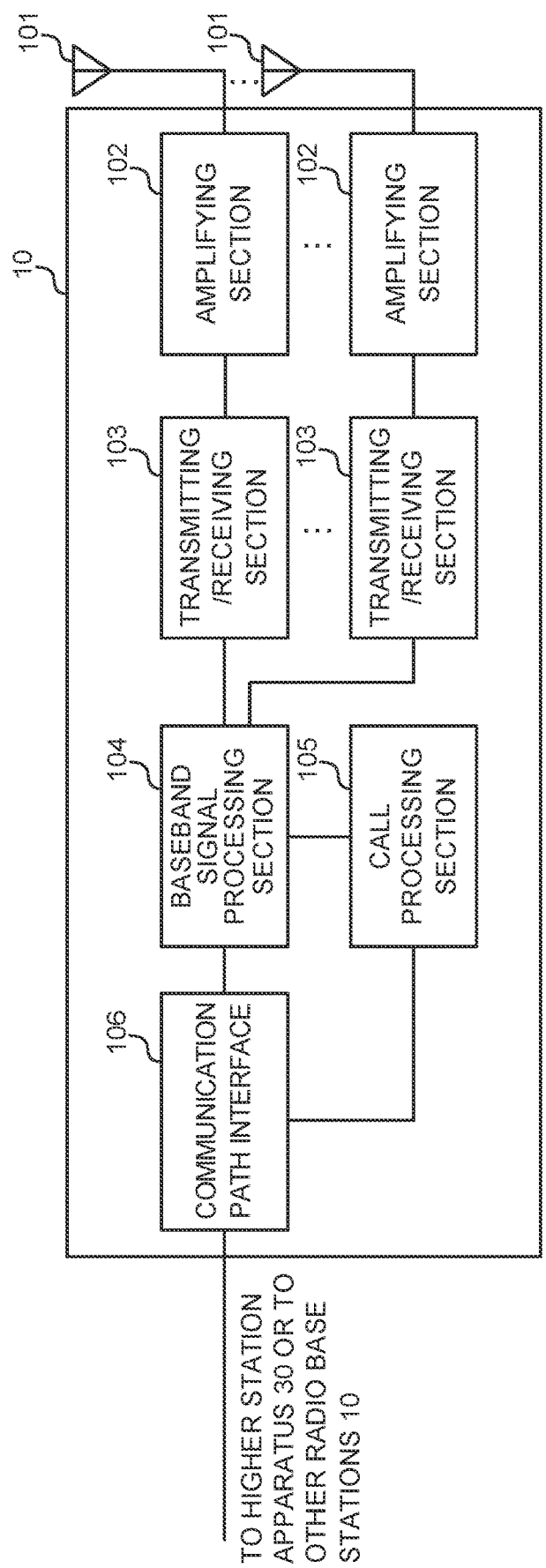
FIG. 3 is a diagram illustrating an exemplary overall configuration of a base station according to one embodiment.

FIG. 3 is a diagram illustrating an exemplary overall configuration of a base station according to one embodiment. A base station 10 includes a plurality of transmission/reception antennas 101, amplifying sections 102, transmitting/receiving sections 103, a baseband signal processing section 104, a call processing section 105, and a communication path interface 106. Note that it is sufficient if one or more transmission/reception antennas 101, one or more amplifying sections 102, and one or more transmitting/receiving sections 103 are provided.

User data to be transmitted from the base station 10 to the user terminal 20 on the downlink is input from the higher station apparatus 30 to the baseband signal processing section 104 via the communication path interface 106.

In the baseband signal processing section 104, the user data is subject to transmission processes including a Packet Data Convergence Protocol (PDCP) layer process, division and combining of the user data, a Radio Link Control (RLC) layer transmission process such as RLC retransmission control, Medium Access Control (MAC) retransmission control (e.g., an HARQ transmission process), scheduling, transport format selection, channel coding, an Inverse Fast Fourier Transform (IFFT) process, and a precoding process, and is forwarded to the transmitting/receiving sections 103. Furthermore, downlink control signals are also subject to transmission processes such as channel coding and an inverse fast Fourier transform, and are forwarded to the transmitting/receiving sections 103.

The base band signals, which are pre-coded and output from the baseband signal processing section 104 for each antenna, are converted into a radio frequency band in the transmitting/receiving sections 103 and then transmitted. The radio frequency signals having been subject to frequency conversion in the transmitting/receiving sections 103 are amplified by the amplifying sections 102, and are transmitted from the transmission/reception antennas 101. The transmitting/receiving sections 103 can be constituted by a transmitter/receiver, a transmission/reception circuit, or a transmission/reception apparatus that can be described on the basis of general understanding of the technical field to which the present disclosure pertains. Note that the transmitting/receiving sections 103 may be configured as a transmitting/receiving section in one entity, or may be constituted by a transmitting section and a receiving section.

Meanwhile, as for uplink signals, radio frequency signals received by the transmission/reception antennas 101 are amplified in the amplifying sections 102. The transmitting/receiving sections 103 receive the uplink signals amplified in the amplifying sections 102. The received signals are converted into baseband signals through frequency conversion in the transmitting/receiving sections 103 and output to the baseband signal processing section 104.

In the baseband signal processing section 104, user data included in the input uplink signals is subject to a fast Fourier transform (FFT) process, an inverse discrete Fourier transform (IDFT) process, error correction decoding, a MAC retransmission control receiving process, and RLC layer and PDCP layer receiving processes, and is forwarded to the higher station apparatus 30 via the communication path interface 106. The call processing section 105 performs call processing (such as setting up and releasing) of communication channels, manages the state of the base stations 10, and manages the radio resources, for example.

The communication path interface 106 transmits and receives signals to and from the higher station apparatus 30 via a given interface. Also, the communication path interface 106 may transmit and receive signals (backhaul signaling) to and from other base stations 10 via an inter-base station interface (e.g., optical fiber in conformity with the Common Public Radio Interface (CPRI), X2 interface, etc.).

The transmitting/receiving sections 103 may receive and/or transmit various types of information described in the above-described embodiments from/to the user terminal 20.

Figure 4:
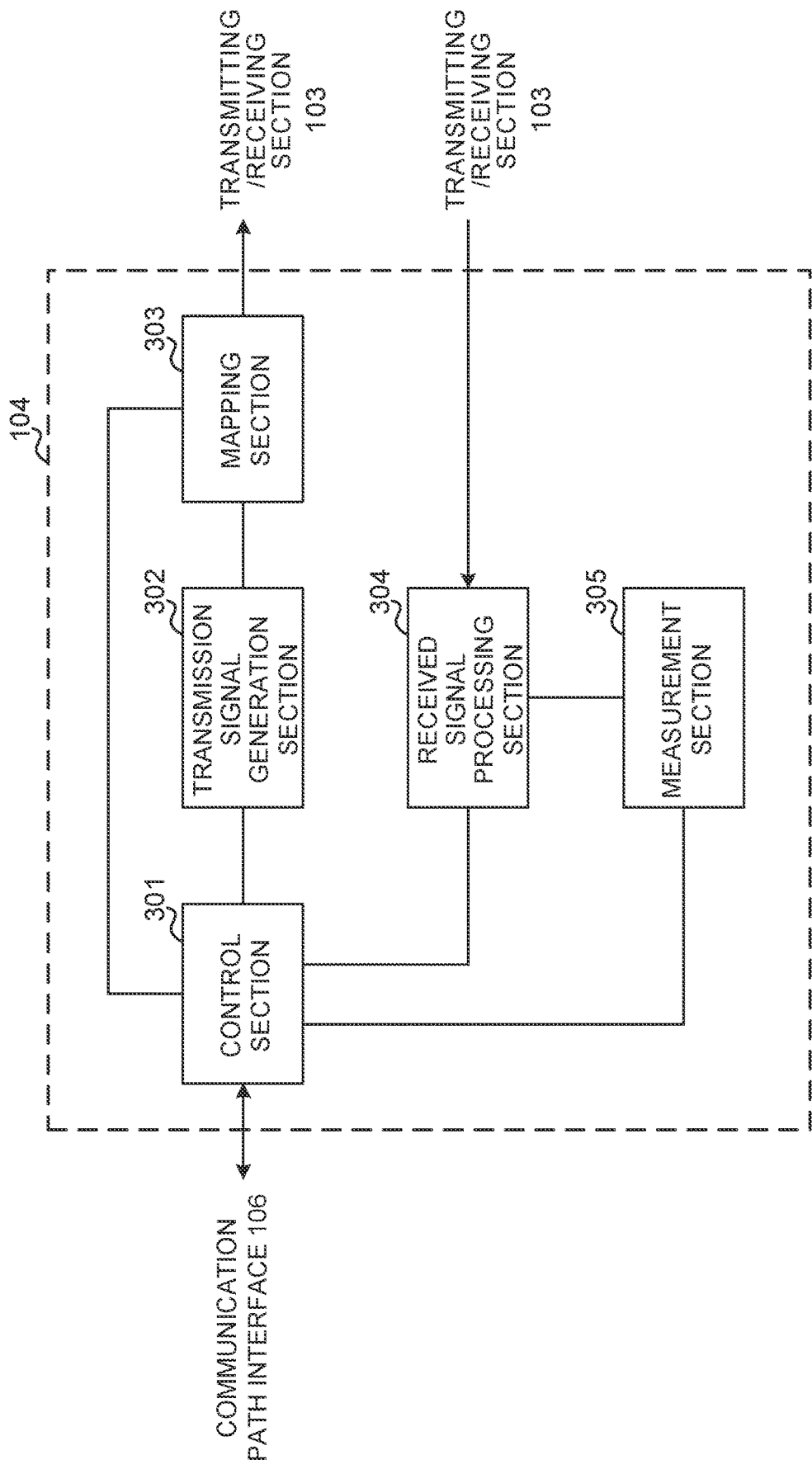
FIG. 4 is a diagram illustrating an exemplary functional configuration of a base station according to one embodiment.

FIG. 4 is a diagram illustrating an exemplary functional configuration of a base station according to one embodiment. Note that, although this example will primarily show functional blocks that pertain to characteristic parts of the present embodiment, it may be assumed that the base station 10 has other functional blocks necessary for radio communication as well.

The baseband signal processing section 104 at least includes a control section (scheduler) 301, a transmission signal generation section 302, a mapping section 303, a received signal processing section 304, and a measurement section 305. Note that these configurations only have to be included in the base station 10, and some or all of these configurations may not be included in the baseband signal processing section 104.

The control section (scheduler) 301 controls the entire base station 10. The control section 301 can be constituted by a controller, a control circuit, or a control apparatus that can be described on the basis of general understanding of the technical field to which the present disclosure pertains.

For example, the control section 301 controls the generation of signals in the transmission signal generation section 302, the allocation of signals in the mapping section 303, and the like. Furthermore, the control section 301 controls the signal reception processing in the received signal processing section 304, the measurement of signals in the measurement section 305, and the like.

The control section 301 controls the scheduling (e.g., resource allocation) of system information, downlink data signals (e.g., signals transmitted in the PDSCH), and downlink control signals (e.g., signals transmitted in the PDCCH and/or the EPDCCH, such as delivery acknowledgement information). The control section 301 controls the generation of downlink control signals, downlink data signals, and the like on the basis of, for example, the results of determining whether or not retransmission control is necessary for uplink data signals.

The control section 301 controls scheduling of synchronization signals (e.g., PSS/SSS), downlink reference signals (e.g., CRS, CSI-RS, and DMRS), and the like.

The control section 301 may use digital BF (e.g., precoding) by the baseband signal processing section 104 and/or analog BF (e.g., phase rotation) by the transmitting/receiving sections 103 to perform control to form a Tx beam and/or a reception beam.

The transmission signal generation section 302 generates downlink signals (downlink control signals, downlink data signals, downlink reference signals, etc.) on the basis of commands from the control section 301, and outputs the signals to the mapping section 303. The transmission signal generation section 302 can be constituted by a signal generator, a signal generation circuit, or a signal generation apparatus that can be described on the basis of general understanding of the technical field to which the present disclosure pertains.

For example, the transmission signal generation section 302 generates DL assignments, which report downlink data allocation information, and/or UL grants, which report uplink data allocation information, on the basis of commands from the control section 301. DL assignments and UL grants are both DCI, and follow the DCI format. Also, the downlink data signals are subject to the coding processing, the modulation processing, and the like using, for example, coding rates and modulation schemes determined on the basis of channel state information (CSI) reported from each user terminal 20 and the like.

The mapping section 303 maps the downlink signals generated in the transmission signal generation section 302 to given radio resources on the basis of commands from the control section 301, and outputs them to the transmitting/receiving sections 103. The mapping section 303 can be constituted by a mapper, a mapping circuit, or a mapping apparatus that can be described on the basis of general understanding of the technical field to which the present disclosure pertains.

The received signal processing section 304 performs reception processing (e.g., demapping, demodulation, decoding, etc.) on the received signals input from the transmitting/receiving sections 103. Here, the received signals include, for example, uplink signals (uplink control signals, uplink data signals, uplink reference signals, etc.) transmitted from the user terminal 20. The received signal processing section 304 can be constituted by a signal processor, a signal processing circuit, or a signal processing apparatus that can be described on the basis of general understanding of the technical field to which the present disclosure pertains.

The received signal processing section 304 outputs, to the control section 301, information decoded by the reception processing. For example, when a PUCCH including an HARQ-ACK is received, the HARQ-ACK is output to the control section 301. Also, the received signal processing section 304 outputs, to the measurement section 305, the received signals and/or the signals having been subject to the reception processing.

The measurement section 305 conducts measurement with respect to the received signals. The measurement section 305 can be constituted by a measurer, a measurement circuit, or a measurement apparatus that can be described on the basis of general understanding of the technical field to which the present disclosure pertains.

For example, the measurement section 305 may perform Radio Resource Management (RRM) measurement, Channel State Information (CSI) measurement, and the like on the basis of the received signals. The measurement section 305 may measure the received power (e.g., Reference Signal Received Power (RSRP)), the received quality (e.g., Reference Signal Received Quality (RSRQ), Signal to Interference plus Noise Ratio (SINR), and Signal to Noise Ratio (SNR)), the signal strength (e.g., Received Signal Strength Indicator (RSSI)), transmission path information (e.g., CSI), and the like. The measurement results may be output to the control section 301.

Note that the transmitting/receiving section 103 may receive the UCI transmitted from the user terminal 20 using at least one of the PUCCH and the PUSCH.

The control section 301 may control which of the repetition transmission configuration of the PUSCH and the repetition transmission configuration of the PUCCH is to be used to determine the number of times of the repetition transmission of the PUSCH or the PUCCH including the UCI.

(User Terminal)

Figure 5:
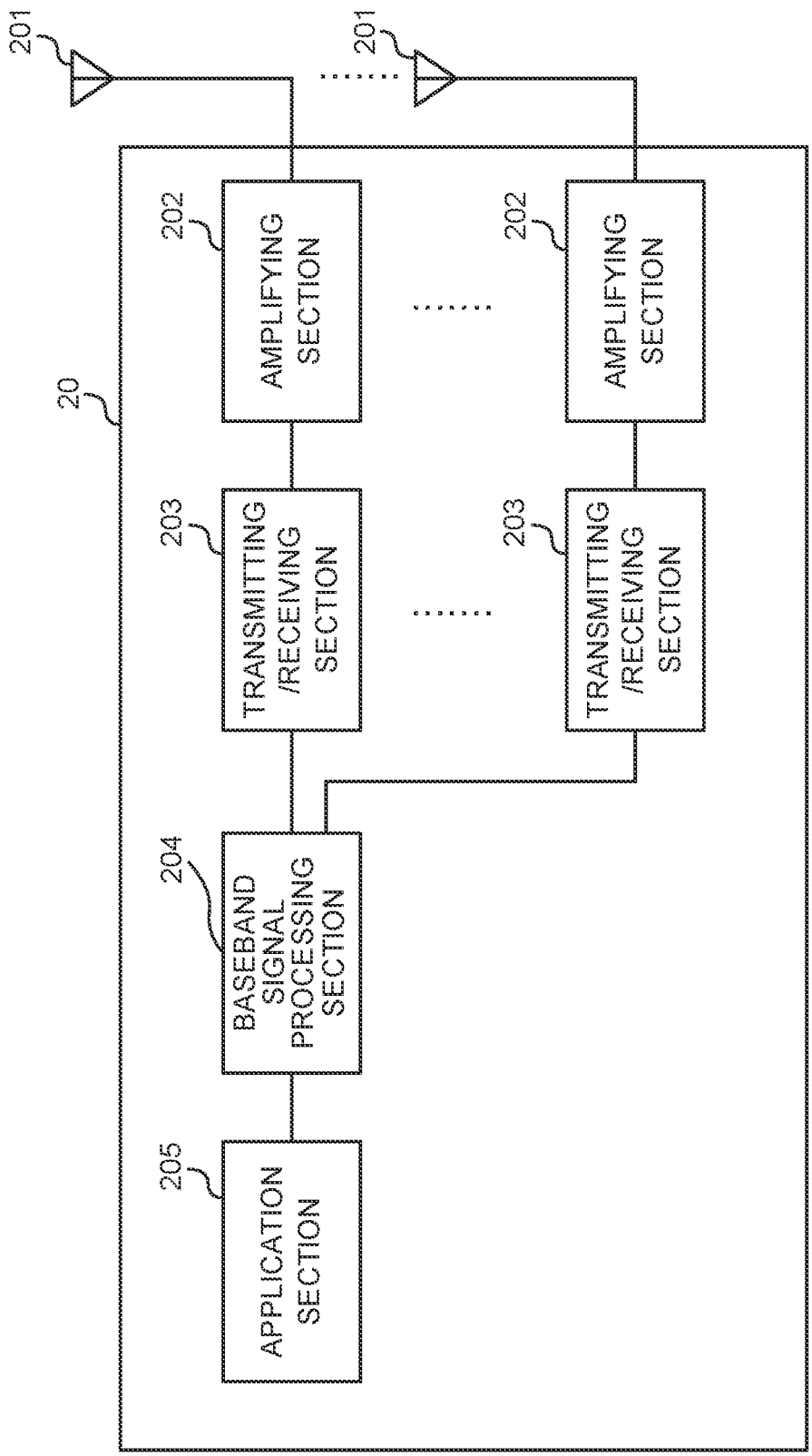
FIG. 5 is a diagram illustrating an exemplary overall configuration of a user terminal according to one embodiment.

FIG. 5 is a diagram illustrating an exemplary overall configuration of a user terminal according to one embodiment. The user terminal 20 includes a plurality of transmission/reception antennas 201, amplifying sections 202, transmitting/receiving sections 203, a baseband signal processing section 204, and an application section 205. Note that it is sufficient if one or more transmission/reception antennas 201, one or more amplifying sections 202, and one or more transmitting/receiving sections 203 are provided.

Radio frequency signals received in the transmission/reception antennas 201 are amplified in the amplifying sections 202. The transmitting/receiving sections 203 receive the downlink signals amplified in the amplifying sections 202. The received signals are converted into baseband signals through frequency conversion in the transmitting/receiving sections 203 and output to the baseband signal processing section 204. The transmitting/receiving sections 203 can be constituted by a transmitters/receiver, a transmission/reception circuit, or a transmission/reception apparatus that can be described on the basis of general understanding of the technical field to which the present disclosure pertains. Note that the transmitting/receiving sections 203 may be configured as a transmitting/receiving section in one entity, or may be constituted by a transmitting section and a receiving section.

The baseband signal processing section 204 performs an FFT process, error correction decoding, a retransmission control receiving process, and the like on the input base band signals. Downlink user data is forwarded to the application section 205. The application section 205 performs processes related to higher layers above the physical layer and the MAC layer, and the like. In addition, in the downlink data, the broadcast information can be also forwarded to the application section 205.

Meanwhile, uplink user data is input from the application section 205 to the baseband signal processing section 204. The baseband signal processing section 204 performs a retransmission control transmission processing (e.g., HARQ transmission processing), channel coding, precoding, discrete Fourier transform (DFT) processing, IFFT processing, and the like, and the result is forwarded to the transmitting/receiving sections 203.

The baseband signals output from the baseband signal processing section 204 are converted into a radio frequency band in the transmitting/receiving sections 203 and then transmitted. The radio frequency signals having been subject to frequency conversion in the transmitting/receiving sections 203 are amplified in the amplifying sections 202, and are transmitted from the transmission/reception antennas 201.

Figure 6:
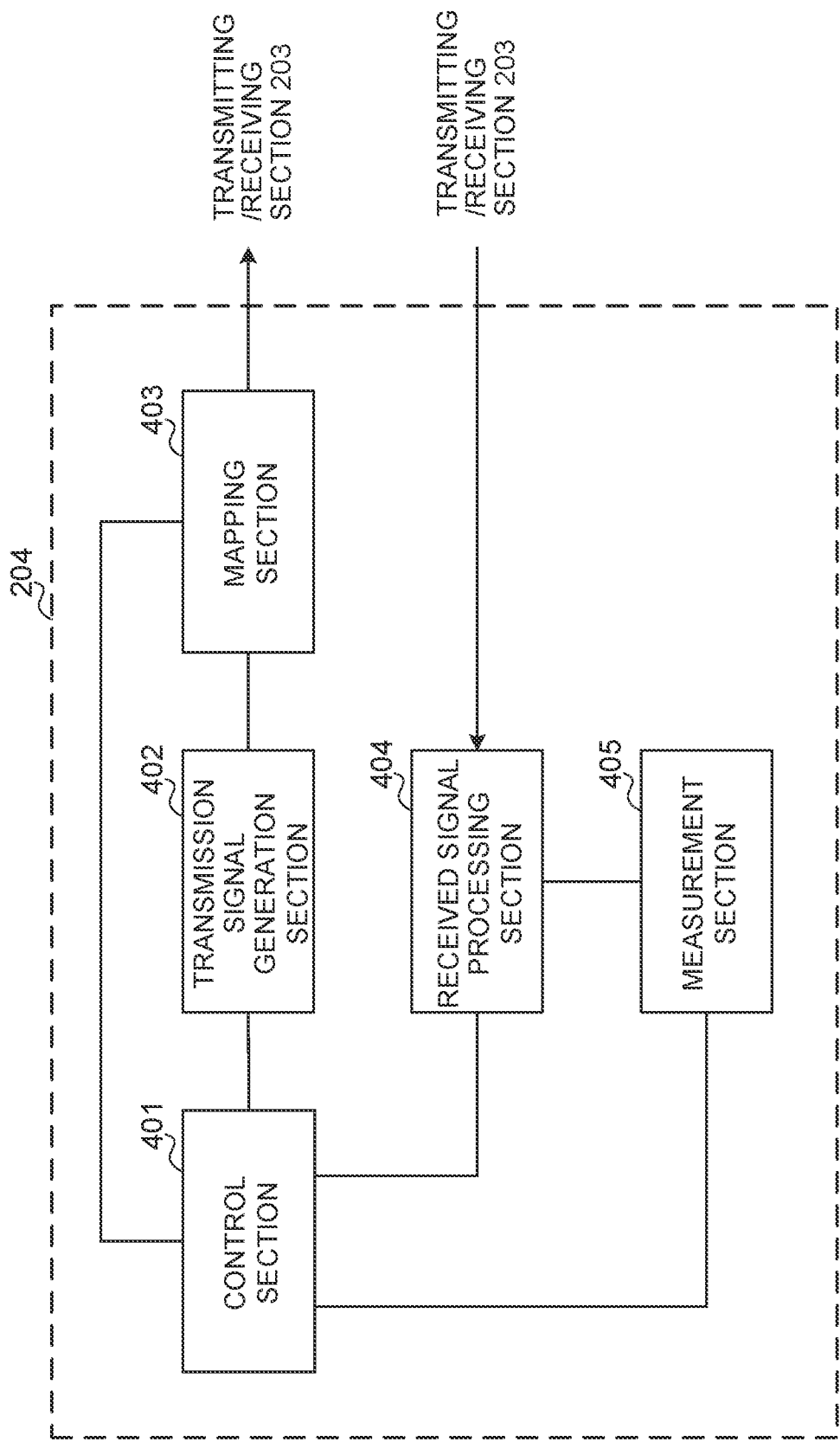
FIG. 6 is a diagram illustrating an exemplary functional configuration of a user terminal according to one embodiment.

FIG. 6 is a diagram illustrating an exemplary functional configuration of a user terminal according to one embodiment. Note that, although the present example will primarily show functional blocks that pertain to characteristic parts of the present embodiment, it may be assumed that the user terminal 20 has other functional blocks necessary for radio communication as well.

The baseband signal processing section 204 provided in the user terminal 20 at least includes a control section 401, a transmission signal generation section 402, a mapping section 403, a received signal processing section 404, and a measurement section 405. Note that these configurations only have to be included in the user terminal 20, and some or all of the configurations may not be included in the baseband signal processing section 204.

The control section 401 controls the entire user terminal 20. The control section 401 can be constituted by a controller, a control circuit, or a control apparatus that can be described on the basis of general understanding of the technical field to which the present disclosure pertains.

The control section 401 controls, for example, the generation of signals in the transmission signal generation section 402, the allocation of signals in the mapping section 403, and the like. Furthermore, the control section 401 controls the signal reception processing in the received signal processing section 404, the measurement of signals in the measurement section 405, and the like.

The control section 401 obtains, from the received signal processing section 404, the downlink control signals and downlink data signals transmitted from the base station 10. The control section 401 controls the generation of uplink control signals and/or uplink data signals on the basis of, for example, the results of determining whether or not retransmission control is necessary for the downlink control signals and/or downlink data signals.

Further, when the control section 401 obtains, from the received signal processing section 404, various kinds of information reported from the base station 10, it may update the parameters to be used for control on the basis of the information.

The transmission signal generation section 402 generates uplink signals (uplink control signals, uplink data signals, uplink reference signals, etc.) on the basis of commands from the control section 401, and outputs the signals to the mapping section 403. The transmission signal generation section 402 can be constituted by a signal generator, a signal generation circuit, or a signal generation apparatus that can be described on the basis of general understanding of the technical field to which the present disclosure pertains.

For example, the transmission signal generation section 402 generates uplink control signals related to delivery acknowledgement information, channel state information (CSI), and the like on the basis of commands from the control section 401. Also, the transmission signal generation section 402 generates uplink data signals on the basis of commands from the control section 401. For example, when a UL grant is included in the downlink control signals reported from the base station 10, the control section 401 instructs the transmission signal generation section 402 to generate uplink data signals.

The mapping section 403 maps the uplink signals generated in the transmission signal generation section 402 to radio resources on the basis of commands from the control section 401, and output the result to the transmitting/receiving sections 203. The mapping section 403 can be constituted by a mapper, a mapping circuit, or a mapping apparatus that can be described on the basis of general understanding of the technical field to which the present disclosure pertains.

The received signal processing section 404 performs reception processing (e.g., demapping, demodulation, decoding, etc.) on the received signals input from the transmitting/receiving sections 203. Here, the received signals include, for example, downlink signals (downlink control signals, downlink data signals, downlink reference signals, etc.) transmitted from the base station 10. The received signal processing section 404 can be constituted by a signal processor, a signal processing circuit, or a signal processing apparatus that can be described on the basis of general understanding of the technical field to which the present disclosure pertains. Also, the received signal processing section 404 can constitute the receiving section according to the present disclosure.

The received signal processing section 404 outputs the decoded information obtained through the reception processing to the control section 401. The received signal processing section 404 outputs, for example, broadcast information, system information, RRC signaling, DCI, and the like, to the control section 401. Also, the received signal processing section 404 outputs, to the measurement section 405, the received signals and/or the signals having been subject to the reception processing.

The measurement section 405 conducts measurement with respect to the received signals. The measurement section 405 can be constituted by a measurer, a measurement circuit, or a measurement apparatus that can be described on the basis of general understanding of the technical field to which the present disclosure pertains.

For example, the measurement section 405 may perform RRM measurement, CSI measurement, and the like on the basis of the received signals. The measurement section 405 may measure the received power (e.g., RSRP), the received quality (e.g., RSRQ, SINR, and SNR), the signal strength (e.g., RSSI), transmission path information (e.g., CSI), and the like. The measurement results may be output to the control section 401.

Note that, when the transmission timing of uplink control information (UCI) using a physical uplink control channel (PUCCH) and the transmission timing of a physical uplink shared channel (PUSCH) overlap with each other or are the same timing, the transmitting/receiving section 203 may transmit the UCI using the PUSCH (UCI on PUSCH).

The control section 401 may control which of the repetition transmission configuration of the PUSCH and the repetition transmission configuration of the PUCCH is to be used to determine the number of times of the repetition transmission of the PUSCH or the PUCCH including the UCI.

Here, the repetition transmission configuration of the PUCCH may be, for example, the RRC information element "PUCCH-Config", or may be the RRC parameter "nrofSlots" described above. The repetition transmission configuration of the PUSCH may be, for example, the RRC information element "PUSCH-Config", or may be at least one of the above-described RRC parameter "aggregation-FactorUL", the RRC parameter "repK", and the like.

The control section 401 may determine the number of times of the repetition transmission of the PUSCH including the UCI according to the repetition transmission configuration of the PUSCH.

The control section 401 may determine the number of times of the repetition transmission of the PUSCH including the UCI according to the repetition transmission configuration of the PUCCH when the PUSCH does not include uplink data (PUSCH transmission not including UL-SCH is scheduled), and may determine it according to the repetition transmission configuration of the PUSCH otherwise.

The control section 401 may determine the number of times of the repetition transmission of the PUSCH including the UCI to be a given number (e.g., 1 (no repeat) and 0 (no transmission)) when the PUSCH does not include uplink data.

When the UCI corresponds to a specific UCI type, the control section 401 may determine the number of times of the repetition transmission of the PUSCH including the UCI according to a repetition transmission configuration of a higher layer parameter other than the repetition transmission configuration of the PUCCH and the repetition transmission configuration of the PUSCH.

When the UCI corresponds to a specific UCI type, the control section 401 may determine the number of times of the repetition transmission of the PUSCH including the UCI on the basis of information associated with repetition included in a signal (e.g., DCI, MAC signaling (MAC CE), etc.) that has triggered (activated) the transmission of the specific UCI type.

Note that the "UCI" and the "specific UCI type" in the present disclosure may be replaced with each other.

(Hardware Configuration)

Note that the block diagrams used in the descriptions of the embodiments above show blocks in functional units. Those functional blocks (components) may be implemented in optional combinations of at least one of hardware and software. Also, the method for implementing each functional block is not particularly limited. That is, each functional block may be achieved by a single apparatus physically or logically aggregated, or may be achieved by directly or indirectly connecting two or more physically or logically separate apparatuses (e.g., using wires, radio, etc.) and using those plural apparatuses. The functional blocks may be achieved by combining the one apparatus or the plurality of apparatuses with software.

Here, the functions include, but are not limited to, assessment, determination, judging, calculation, computation, processing, derivation, investigation, search, confirmation, reception, transmission, output, access, solution, selection, choosing, establishment, comparison, assumption, expectation, deeming, broadcasting, notifying, communicating, forwarding, configuring, reconfiguring, allocating, mapping, and assigning. For example, a functional block (component) that causes transmission to function may be called a transmitting unit, a transmitter, or the like. In any case, as described above, the implementation method is not particularly limited.

Figure 7:
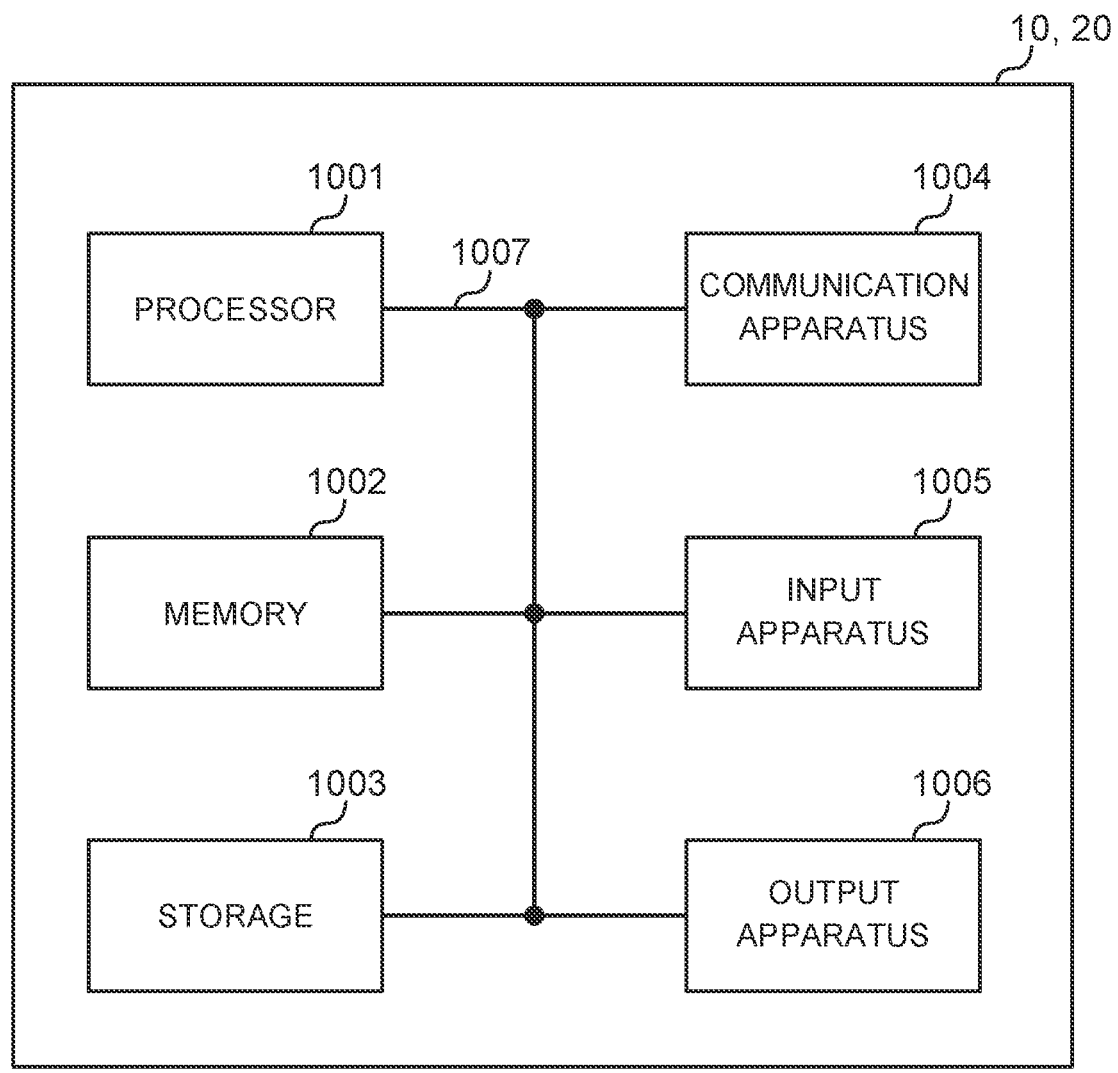
FIG. 7 is a diagram illustrating an exemplary hardware configuration of a base station and a user terminal according to one embodiment.

For example, the base station, the user terminal, and the like according to one embodiment of the present disclosure may function as a computer that executes the processing of the radio communication method of the present disclosure. FIG. 7 is a diagram illustrating an exemplary hardware configuration of a base station and a user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that, in the present disclosure, the word such as an apparatus, a circuit, a device, a section, and a unit can be replaced with each other. The hardware configuration of the base station 10 and the user terminal 20 may be designed to include one or a plurality of each apparatuses illustrated in the drawings, or may be designed not to include some apparatuses.

For example, although only one processor 1001 is illustrated, a plurality of processors may be provided. Furthermore, processes may be executed using one processor, or processes may be executed simultaneously, in sequence, or in different manners, using two or more processors. Note that the processor 1001 may be implemented with one or more chips.

Each function of the base station 10 and the user terminal 20 is implemented by reading given software (program) on hardware such as the processor 1001 and the memory 1002, and by controlling the operation in the processor 1001, the communication in the communication apparatus 1004, and at least one of the reading and writing of data in the memory 1002 and the storage 1003.

The processor 1001 controls the whole computer by, for example, running an operating system. The processor 1001 may be configured with a central processing unit (CPU), which includes interfaces with peripheral equipment, a control apparatus, a computing apparatus, a register, and the like. For example, the above-described baseband signal processing section 104 (204), the call processing section 105, and the like may be implemented by the processor 1001.

Furthermore, the processor 1001 reads, for example, programs (program codes), software modules, or data from at least one of the storage 1003 and the communication apparatus 1004 into the memory 1002, and executes various kinds of processing according to these. As for the programs, programs to cause computers to execute at least part of the operations described in the above-described embodiments are used. For example, the control section 401 of the user terminal 20 may be implemented by control programs that are stored in the memory 1002 and that operate on the processor 1001, and other functional blocks may be implemented likewise.

The memory 1002 is a computer-readable recording medium, and may be constituted by, for example, at least one of a Read Only Memory (ROM), an Erasable Programmable ROM (EPROM), an Electrically EPROM (EEPROM), a Random Access Memory (RAM), or other appropriate storage media. The memory 1002 may be called a "register," a "cache," a "main memory (primary storage apparatus)", and the like. The memory 1002 can store a program (program code), a software module, and the like, which are executable for implementing the radio communication method according to one embodiment of the present disclosure.

The storage 1003 is a computer-readable recording medium, and may be constituted by, for example, at least one of a flexible disk, a floppy (registered trademark) disk, a magneto-optical disk (e.g., a compact disc (Compact Disc ROM (CD-ROM), etc.), a digital versatile disc, and a Blu-ray (registered trademark) disk), a removable disk, a hard disk drive, a smart card, a flash memory device (e.g., a card, a stick, and a key drive), a magnetic stripe, a database, a server, and other appropriate storage media. The storage 1003 may be called a secondary storage apparatus.

The communication apparatus 1004 is hardware (transmission/reception device) for performing inter-computer communication via at least one of a wired network and a wireless network, and is referred to as, for example, a "network device", a "network controller", a "network card", a "communication module", and the like. The communication apparatus 1004 may include a high frequency switch, a duplexer, a filter, a frequency synthesizer, and the like in order to implement, for example, at least one of frequency division duplex (FDD) and time division duplex (TDD). For example, the above-described transmission/reception antennas 101 (201), amplifying sections 102 (202), transmitting/receiving sections 103 (203), communication path interface 106, and the like may be implemented by the communication apparatus 1004. The transmitting/receiving sections 103 (203) may be implemented in a physically or logically separated manner by the transmitting section 103a (203a) and the receiving section 103b (203b).

The input apparatus 1005 is an input device (e.g., a keyboard, a mouse, a microphone, a switch, a button, a sensor, etc.) for receiving input from the outside. The output apparatus 1006 is an output device (e.g., a display, a speaker, a Light Emitting Diode (LED) lamp, etc.) for executing output to the outside. Note that the input apparatus 1005 and the output apparatus 1006 may be provided in an integrated structure (e.g., a touch panel).

Furthermore, those pieces of apparatuses including the processor 1001, the memory 1002, and the like are connected by the bus 1007 for communicating information. The bus 1007 may be formed with a single bus, or may be formed with buses that vary between apparatuses.

Also, the base station 10 and the user terminal 20 may be configured while including hardware such as a microprocessor, a Digital Signal Processor (DSP), an Application-Specific Integrated Circuit (ASIC), a Programmable Logic Device (PLD), and a Field Programmable Gate Array (FPGA), and part or all of the functional blocks may be implemented by the hardware. For example, the processor 1001 may be implemented using at least one of those pieces of hardware.

(Variations)

Note that the terminology used in the present disclosure and the terminology needed to understand the present disclosure may be replaced with other terms that convey the same or similar meanings. For example, at least one of "channels" and "symbols" may be replaced with "signals" (or "signaling"). Also, "signals" may be replaced with "messages." A reference signal may be abbreviated as an "RS," and may be called a "pilot," a "pilot signal", and the like depending on which standard applies. Furthermore, a "component carrier (CC)" may be called a "cell," a "frequency carrier," a "carrier frequency", and the like.

A radio frame may include one or more periods (frames) in the time domain. Each of one or more periods (frames) included in a radio frame may be called a "subframe." Furthermore, a subframe may include one or multiple slots in the time domain. A subframe may be a fixed time duration (e.g., 1 ms) that is not dependent on numerology.

Here, the numerology may be a communication parameter applied to at least one of transmission and reception of a certain signal or channel. For example, the numerology may indicate at least one of SubCarrier Spacing (SCS), a bandwidth, a symbol length, a cyclic prefix length, a transmission time interval (TTI), the number of symbols per TTI, a radio frame structure, specific filtering processing to be performed by a transceiver in the frequency domain, specific windowing processing to be performed by a transceiver in the time domain, and the like.

A slot may be comprised of one or more symbols (Orthogonal Frequency Division Multiplexing (OFDM) symbols, Single Carrier Frequency Division Multiple Access (SC-FDMA) symbols, etc.) in the time domain. Also, a slot may be a time unit based on numerology.

A slot may include a plurality of mini slots. Each mini slot may be comprised of one or more symbols in the time domain. Also, a mini slot may be called a "subslot." Each mini slot may be comprised of fewer symbols than a slot. A PDSCH (or PUSCH) transmitted in a time unit larger than a mini slot may be called PDSCH (PUSCH) mapping type A. A PDSCH (or PUSCH) transmitted using a mini slot may be called PDSCH (PUSCH) mapping type B.

A radio frame, a subframe, a slot, a mini slot, and a symbol all represent the time unit in signal communication. A radio frame, a subframe, a slot, a mini slot, and a symbol may be each called by other applicable names. Note that time units such as a frame, a subframe, a slot, a mini slot, and a symbol in the present disclosure may be replaced with each other.

For example, one subframe may be called a transmission time interval (TTI), a plurality of consecutive subframes may be referred to as a TTI, or one slot or one mini slot may be referred to as a TTI. That is, at least one of a subframe and a TTI may be a subframe (1 ms) in existing LTE, may be a period shorter than 1 ms (e.g., one to thirteen symbols), or may be a period longer than 1 ms. Note that the unit to represent the TTI may be called a "slot," a "mini slot", or the like, instead of a "subframe".

Here, a TTI refers to the minimum time unit of scheduling in radio communication, for example. For example, in LTE systems, the base station schedules the radio resources (such as the frequency bandwidth and transmission power that can be used in each user terminal) to allocate to each user terminal in TTI units. Note that the definition of the TTI is not limited thereto.

The TTI may be the transmission time unit of channel-encoded data packets (transport blocks), code blocks, codewords, and the like, or may be the unit of processing in scheduling, link adaptation, and the like. Note that, when TTI is given, a time interval (e.g., the number of symbols) in which the transport blocks, the code blocks, the codewords, and the like are actually mapped may be shorter than the TTI.

Note that, when one slot or one mini slot is called a "TTI," one or more TTIs (i.e., one or multiple slots or one or more mini slots) may be the minimum time unit of scheduling. Also, the number of slots (the number of mini slots) to constitute the minimum time unit of scheduling may be controlled.

A TTI having a time length of 1 ms may be called usual TTI (TTI in LTE Rel. 8 to 12), normal TTI, long TTI, a usual subframe, a normal subframe, a long subframe, a slot, or the like. A TTI shorter than a usual TTI may be called a shortened TTI, a short TTI, a partial TTI (or fractional TTI), a shortened subframe, a short subframe, a mini slot, a subslot, a slot, or the like.

Note that a long TTI (e.g., a normal TTI, a subframe, etc.) may be replaced with a TTI having a time duration exceeding 1 ms, and a short TTI (e.g., a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. The number of subcarriers included in the RB may be the same regardless of the numerology, and may be 12, for example. The number of subcarriers included in the RB may be determined on the basis of numerology.

Also, an RB may include one or more symbols in the time domain, and may be one slot, one mini slot, one subframe, or one TTI in length. One TTI, one subframe, and the like each may be comprised of one or more resource blocks.

Note that one or more RBs may be called a physical resource block (Physical RB (PRB)), a subcarrier group (SCG), a resource element group (REG), an PRB pair, an RB pair, and the like.

Furthermore, a resource block may be comprised of one or more resource elements (REs). For example, one RE may be a radio resource field of one subcarrier and one symbol.

The bandwidth part (BWP) (which may be called partial bandwidth, etc.) may represent a subset of consecutive common resource blocks (RBs) for a certain numerology in a certain carrier. Here, the common RB may be specified by the index of the RB based on a common reference point of the carrier. The PRB may be defined in a BWP and numbered within that BWP.

The BWP may include a BWP for UL (UL BWP) and a BWP for DL (DL BWP). For the UE, one or more BWPs may be configured within one carrier.

At least one of the configured BWPs may be active, and the UE may not assume to transmit or receive a given signal/channel outside the active BWP. Note that a "cell", "carrier", and the like in the present disclosure may be read as a "BWP".

Note that the structures of radio frames, subframes, slots, mini slots, symbols, and the like described above are merely examples. For example, configurations pertaining to the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol duration, the length of cyclic prefixes (CPs), and the like can be variously changed.

Also, the information, parameters, and the like described in the present disclosure may be represented in absolute values or in relative values with respect to given values, or may be represented using other applicable information. For example, a radio resource may be specified by a given index.

The names used for parameters and the like in the present disclosure are in no respect limiting. In addition, an equation and the like using those parameters may differ from those explicitly disclosed in the present disclosure. Since various channels (Physical Uplink Control Channel (PUCCH), Physical Downlink Control Channel (PDCCH), etc.) and information elements can be identified by any suitable names, the various names assigned to those individual channels and information elements are in no respect limiting.

The information, signals, and the like described in the present disclosure may be represented using a variety of different techniques. For example, data, instructions, commands, information, signals, bits, symbols, and chips, all of which may be referenced throughout the above description, may be represented by voltages, currents, electromagnetic waves, magnetic fields or particles, optical fields or photons, or any combination of these.

Also, information, signals, and the like can be output in at least one of directions that are from upper layers to lower layers and from lower layers to upper layers. Information, signals, and the like may be input and output via a plurality of network nodes.

The input and/or output information, signals, and the like may be stored in a specific location (e.g., in a memory), or may be managed using a management table. The information, signals, and the like to be input and/or output can be overwritten, updated, or appended. The output information, signals, and the like may be deleted. The input information, signals, and the like may be transmitted to another apparatus.

Notification of information is by no means limited to the aspects/embodiments described in the present disclosure, and other methods may be used as well. For example, notification of information may be implemented using physical layer signaling (e.g., Downlink Control Information (DCI) and Uplink Control Information (UCI), higher layer signaling (e.g., Radio Resource Control (RRC) signaling, broadcast information (Master Information Block (MIB), System Information Block (SIB), etc.), Medium Access Control (MAC) signaling, and other signals and/or combinations of these.

Note that the physical layer signaling may be called Layer 1/Layer 2 (L1/L2) control information (L1/L2 control signals), L1 control information (L1 control signals), and the like. Also, the RRC signaling may be called RRC messages, and may be, for example, an RRC connection setup message, an RRC connection reconfiguration message, and the like. Also, the MAC signaling may be reported using, for example, MAC control elements (MAC CEs).

Also, notification of given information (e.g., notification of information to the effect that "X holds") does not necessarily have to be sent explicitly, and may be sent implicitly (e.g., by not reporting the given information, or by reporting another piece of information).

Determination may be made in values represented by one bit (0 or 1), may be made in Boolean values represented by true or false, or may be made by comparing numerical values (e.g., comparison against a given value).

Software, whether referred to as software, firmware, middleware, microcode, or hardware description language, or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and the like.

Also, software, instructions, information, and the like may be transmitted and received via communication media. For example, when software is transmitted from a website, a server, or other remote sources by using at least one of wired technologies (coaxial cables, optical fiber cables, twisted-pair cables, digital subscriber lines (DSLs), etc.) and wireless technologies (infrared radiation, microwaves, etc.), at least one of those wired technologies and wireless technologies are also included in the definition of communication media.

The terms "system" and "network" as used in the present disclosure can be used interchangeably.

In the present disclosure, the terms such as "precoding", "precoder", "weight (precoding weight)", "Quasi-Co-Location (QCL)", "transmission configuration indication (TCI) state", "spatial relation", "spatial domain filter", "transmission power", "phase rotation", "antenna port", "antenna port group", "layer", "layer number", "rank", "resource", "resource set", "resource group", "beam", "beam width", "beam angle", "antenna", "antenna element", and "panel" may be used interchangeably.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier," and "component carrier" may be used interchangeably. The base station may be called a term such as a macro cell, a small cell, a femto cell, a pico cell, and the like.

A base station can accommodate one or more (e.g., three) cells. When a base station accommodates a plurality of cells, the entire coverage area of the base station can be partitioned into multiple smaller areas, and each smaller area can provide communication services through base station subsystems (e.g., indoor small base stations (Remote Radio Heads (RRHs)). The term "cell" or "sector" refers to all or part of the coverage area of at least one of a base station and a base station subsystem that provides communication services within this coverage.

In the present disclosure, the terms "mobile station (MS)", "user terminal", "user equipment (UE)", "terminal", and the like may be used interchangeably.

A mobile station may be called a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of a base station and a mobile station may be called a transmission apparatus, a reception apparatus, a radio communication apparatus, or the like. Note that at least one of the base station and the mobile station may be a device mounted on a mobile entity, a mobile entity itself, or the like. The mobile entity may be a transportation (e.g., a car, an airplane, etc.), an unmanned mobile entity (e.g., a drone, an autonomous car, etc.), or a (manned or unmanned) robot. Note that at least one of the base station and the mobile station also includes a device that does not necessarily move during a communication operation. For example, at least one of the base station and the mobile station may be an Internet of Things (IoT) device such as a sensor.

Furthermore, a base station in the present disclosure may be interpreted as a user terminal. For example, each aspect/embodiment of the present disclosure may be applied to a structure in which communication between the base station and the user terminal is replaced with communication among a plurality of user terminals (which may be called, for example, D2D (Device-to-Device), V2X (Vehicle-to-Everything), etc.). In this case, the user terminal 20 may have the functions of the base station 10 described above. In addition, the wording such as "uplink" and "downlink" may be replaced with the wording corresponding to communication between terminals (e.g., "side"). For example, an uplink channel, a downlink channel, and the like may be interpreted as a side channel.

Likewise, a user terminal in the present disclosure may be interpreted as a base station. In this case, the base station 10 may have the functions of the user terminal 20 described above.

Certain operations that have been described in the present disclosure to be performed by base stations may be performed by their upper nodes in some cases. In a network including one or more network nodes with base stations, it is obvious that various operations performed to communicate with terminals can be performed by base stations, one or more network nodes (e.g., Mobility Management Entities (MMEs), Serving-Gateways (S-GWs), etc. may be possible, but these are not limiting) other than base stations, or combinations of these.

The aspects/embodiments described in the present disclosure may be used individually or in combinations, which may be switched depending on the mode of implementation. The order of processes, sequences, flowcharts, and the like that have been used to describe the aspects/embodiments in the present disclosure may be re-ordered as long as inconsistencies do not arise. For example, although various methods have been shown in the present disclosure with various components of steps using exemplary orders, the specific orders that are shown herein are by no means limiting.

The aspects/embodiments described in the present disclosure may be applied to the Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New Radio Access Technology (New-PAT), New Radio (NR), New radio access (NX), Future generation radio access (FX), Global System for Mobile communications (GSM) (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and/or next generation systems that are enhanced based on these. Further, a plurality of systems may be combined and applied (e.g., a combination of LTE or LTE-A and 5G).

The phrase "on the basis of" as used in the present disclosure does not mean "only on the basis of", unless otherwise specified. In other words, the phrase "on the basis of" means both "only on the basis of" and "at least on the basis of."

Reference to elements with designations such as "first," "second", and the like as used in the present disclosure does not generally limit the number/quantity or order of these elements. These designations may be used in the present disclosure only for convenience, as a method for distinguishing between two or more elements. In this way, reference to the first and second elements does not imply that only two elements may be employed, or that the first element must precede the second element in some way.

The term "determining" as used in the present disclosure may encompass a wide variety of operations. For example, "determining" may be regarded as judging, calculating, computing, processing, deriving, investigating, looking up, search, inquiry (e.g., looking up in a table, database, or another data structure), ascertaining, and the like.

Furthermore, "determining" as used herein may be interpreted to mean making determination related to receiving (e.g., receiving information), transmitting (e.g., transmitting information), inputting, outputting, accessing (e.g., accessing data in a memory), and the like.

In addition, "determining" as used herein may be interpreted to mean making determination related to resolving, selecting, choosing, establishing, comparing, and the like. In other words, "determining" as used herein may be interpreted to mean making determination related to some operations.

In addition, "determining" as used herein may be interpreted to mean "assuming", "expecting", "considering", and the like.

As used in the present disclosure, the terms "connected" and "coupled," or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be interpreted as "access."

As used in the present disclosure, when two elements are connected, these elements may be considered "connected" or "coupled" to each other by using one or more electrical wires, cables, printed electrical connections, and the like, and, as some non-limiting and non-inclusive examples, by using electromagnetic energy, such as electromagnetic energy having wavelengths in the radio frequency, microwave, and optical (both visible and invisible) domains.

In the present disclosure, the phrase "A and B are different" may mean "A and B are different from each other." Note that the phrase may mean that "A and B are different from C". The terms such as "separated", "coupled", and the like may be similarly interpreted as "different".

When terms such as "include," "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, where translations add articles, such as a, an, and the in English, the present disclosure may include that the noun that follows these articles is in the plural.

Although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Therefore, the description of the present disclosure is provided only for the purpose of explaining examples, and should by no means be construed to limit the invention according to the present disclosure in any way.

The invention claimed is:

1. A terminal comprising:
a transmitter that transmits, when a transmission timing of uplink control information (UCI) using a physical uplink control channel (PUCCH) overlaps with a transmission timing of a physical uplink shared channel (PUSCH), the UCI using the PUSCH; and
a processor that controls which of a repetition transmission configuration of the PUCCH and a repetition transmission configuration of the PUSCH is to be used to determine a number of times of repetition transmission of the PUSCH including the UCI,
wherein when the PUSCH does not include uplink data, the processor determines the number of times of the repetition transmission of the PUSCH including the UCI according to the repetition transmission configuration of the PUCCH, and otherwise, the processor determines the number of times of the repetition transmission of the PUSCH including the UCI according to the repetition transmission configuration of the PUSCH.

2. A radio communication method for a terminal comprising:
  transmitting, when a transmission timing of uplink control information (UCI) using a physical uplink control channel (PUCCH) overlaps with a transmission timing of a physical uplink shared channel (PUSCH), the UCI using the PUSCH; and
  controlling which of a repetition transmission configuration of the PUCCH and a repetition transmission configuration of the PUSCH is to be used to determine a number of times of repetition transmission of the PUSCH including the UCI,
  wherein when the PUSCH does not include uplink data, determining the number of times of the repetition transmission of the PUSCH including the UCI according to the repetition transmission configuration of the PUCCH, and otherwise, determining the number of times of the repetition transmission of the PUSCH including the UCI according to the repetition transmission configuration of the PUSCH.

3. A system comprising a terminal and a base station, wherein:
  the terminal comprises:
    a transmitter that transmits, when a transmission timing of uplink control information (UCI) using a physical uplink control channel (PUCCH) overlaps with a transmission timing of a physical uplink shared channel (PUSCH), the UCI using the PUSCH; and
    a processor that controls which of a repetition transmission configuration of the PUCCH and a repetition transmission configuration of the PUSCH is to be used to determine a number of times of repetition transmission of the PUSCH including the UCI,
    wherein when the PUSCH does not include uplink data, the processor determines the number of times of the repetition transmission of the PUSCH including the UCI according to the repetition transmission configuration of the PUCCH, and otherwise, the processor determines the number of times of the repetition transmission of the PUSCH including the UCI according to the repetition transmission configuration of the PUSCH, and
  the base station comprises:
    a receiver that receives the PUSCH including the UCI.

* * * * *